United States Patent
Barrau et al.

(10) Patent No.: US 10,379,224 B2
(45) Date of Patent: Aug. 13, 2019

(54) INVARIANT PARTICLE FILTERING

(71) Applicants: Safran Electronics & Defense, Boulogne-Billancourt (FR); ASSOCIATION POUR LA RECHERCHE DEVELOPPEMENT DES METHODES ET PROCESSUS INDUSTRIELS—A.R.M.I.N.E.S., Paris (FR)

(72) Inventors: Axel Barrau, Boulogne-Billancourt (FR); Silvère Bonnabel, Paris (FR)

(73) Assignees: Safran Electronics & Defense, Boulogne-Billancourt (FR); Association Pour La Recherche Developpement Des Methodes Et Processus Industriels—A.R.M.I.N.E.S., Paris (FR)

( * ) Notice: Subject to any disclaimer, the term of this patent is extended or adjusted under 35 U.S.C. 154(b) by 337 days.

(21) Appl. No.: 15/324,255

(22) PCT Filed: Jul. 9, 2015

(86) PCT No.: PCT/EP2015/065769
§ 371 (c)(1),
(2) Date: Jan. 5, 2017

(87) PCT Pub. No.: WO2016/005532
PCT Pub. Date: Jan. 14, 2016

(65) Prior Publication Data
US 2017/0160399 A1 Jun. 8, 2017

(30) Foreign Application Priority Data
Jul. 9, 2014 (FR) .................................... 14 01535

(51) Int. Cl.
*G01S 19/37* (2010.01)
*G01S 19/49* (2010.01)

(52) U.S. Cl.
CPC .............. *G01S 19/37* (2013.01); *G01S 19/49* (2013.01)

(58) Field of Classification Search
CPC ................................. G01S 19/37; G01S 19/49
See application file for complete search history.

(56) References Cited

U.S. PATENT DOCUMENTS 8,594,927 B2 * 11/2013 Louis .................. G01C 21/165
701/30.2
8,886,394 B2 * 11/2014 Noonan ................. G01S 7/003
701/23

(Continued)

FOREIGN PATENT DOCUMENTS

WO  WO 2011064677 A2   6/2011

OTHER PUBLICATIONS

International Search Report and Written Opinion in PCT/EP2015/065769 dated Sep. 11, 2015, with English translation. 22 pages.
Search Report and Written Opinion in French Application No. 1401535 dated Apr. 10, 2015, with English translation coversheet. 10 pages.

(Continued)

*Primary Examiner* — Marcus E Windrich
(74) *Attorney, Agent, or Firm* — Womble Bond Dickinson (US) LLP

(57) ABSTRACT

A method for estimating the state of a moving system, using a particle filter. The method implements on one reference particle an estimation of the state and includes a first set of variables and a second set of variables. A random mutation, by the particle filter, of the first set of variables is performed followed by parameterization of an extended Kalman filter using the mutated first set of variables. The Kalman filter produces a new particle using the second set of variables and data measured by at least one sensor. The second set of (Continued)

variables includes at least the variables: orientation, speed and position of the moving system. The Kalman filter is configured assuming that the pair of variables orientation and position has a property of invariance upon a rotation or translation and their orientation and speed has a property of invariance on application of a rotation or translation.

10 Claims, 3 Drawing Sheets

(56) References Cited

U.S. PATENT DOCUMENTS

| | | | |
|---|---|---|---|
| 9,921,306 B1* | 3/2018 | Friesel | G01S 13/72 |
| 2011/0208496 A1* | 8/2011 | Bando | G01S 19/49 |
| | | | 703/2 |
| 2012/0022784 A1* | 1/2012 | Louis | G01C 21/005 |
| | | | 701/445 |

OTHER PUBLICATIONS

Barrau et al. "Invariant Particle Filtering with Application to Localization." 53rd IEEE Conference on Decision and Control, IEEE (Dec. 15, 2014), pp. 5599-5605.
Cappe et al. "An Overview of Existing Methods and Recent Advances in Sequential Monte Carlo." Proceedings of the IEEE, IEEE New York, US, vol. 95, No. 5 (May 1, 2007), pp. 899-924.
Bonnabel et al. "Invariant Extended Kalman Filter: Theory and Application to a Velocity-Aided Attitude Estimation Problem." Proceedings of the 48th IEEE, Pistacataway NJ, US (Dec. 15, 2009). pp. 1297-1304.

\* cited by examiner

INVARIANT PARTICLE FILTERING

GENERAL FIELD

The invention relates to the field of methods for estimating the state of a dynamic system from incomplete or noisy measurements.

The invention more particularly relates to a method applying a particle filtering of a particular type.

STATE OF THE ART

Kalman filter is a well-known tool for estimating the state of a dynamic system governed by matrix, therefore linear equations by means of noisy measurements.

For extending Kalman filter to dynamic systems governed by non-linear equations, a method designated by the expression "extended Kalman filter" (EKF) has been proposed. This development proposes an additional step consisting of linearizing, at each new iteration of the filtering, the equations governing the non-linear system in a point of the vector space which is a state estimated during a preceding iteration. The matrices from this linearization may thus be used for calculating a new state estimated according to the standard Kalman filter method.

However, the extended Kalman filter proves to be not very efficient when the noise of the measurements is not Gaussian. Within the particular case of measurements carried out with a GNSS receiver, it is ascertained that these measurements have a bias subject to unpredictable sudden "jumps" and which may cause irremediably divergence of the estimation of the state.

Moreover a particular extended Kalman filter type is known, a so called "invariant extended Kalman filter", notably described in the article:

"Invariant Extended Kalman Filter: theory and application to a velocity-aided attitude estimation problem", Silvère Bonnabel et al.—Decision and control, 2009—Proceedings of the 48$^{th}$ IEEE conference—15 Dec. 2009—pages 1297-1304.

The invariant filtering described in this article is configured so as to make use of certain invariance properties fulfilled by orientation and velocity variables.

This filtering configuration consists of linearizing an error variable having the same invariances as these orientation and velocity variables, instead of linearizing the error variables which may be encountered in a standard extended Kalman filter.

In other words, the difference between an extended Kalman filter and an invariant extended Kalman filter consist in a particular choice for the error variable.

However, the filtering described in this article operates on the basis of measurements of velocities acquired by a velocity sensor. Such a filtering is not adapted to systems working on the base of position measurements (certain satellite radionavigation systems for example).

Moreover, in this document, the invariance assumption is made according to which the equation describing the time-dependent change in the system is unchanged by the action of a certain group of transformations acting on the system and its inputs (c.f. "Definition 2", page 1298, left column).

Particle filtering, also known under the name of sequential Monte-Carlo method, is another method for estimating a non-linear dynamic system, which supports noisy measurements according to a non-Gaussian noise.

The general principle of particle filtering consists of exploring the space of the relevant state, of estimating by means of a plurality of samples conventionally called "particles", each particle providing a more or less likely estimation of the state.

According to a basic alternative well stated as "bootstrap", the following steps are applied by the particle filtering:
- a "mutation", during which each particle is randomly propagated in the state space,
- a "weighting", during which for each propagated particle a weight is calculated associated from a new set of measurements, the weight indicating the likelihood degree of the particle relatively to the actual state of the system taking into account these measurements,
- a "selection", during which particles provided with a low weight are removed while particles provided with a high weight, more likely, are retained.

From iteration to iteration, the particles explore the state space independently of each other.

Particle filtering is therefore all the more costly in computing resources since there exist a large number of particles to be maintained.

Further, the "bootstrap" alternative is subject to a problem of degeneration of the weights: a single particle ends by having a very high weight, while the other particles have a weight close to zero, which makes the estimation not very efficient in addition to being expensive.

An improved alternative of particle filtering was thus proposed for overcoming this drawback: the Rao-Blackwellized particle filter (or RBPF), notably described in document:

CAPPE O et al.—"An Overview of Existing Methods and Recent Advances in Sequential Monte Carlo"—Proceedings of the IEEE, Vol. 95, No. 5—May 1, 2005—pages 899-924.

The RBF filter proposes the decomposition of a state of dimension K into a first set of variables and a second set of variables, both of these sets undergoing different treatments during a given iteration.

The mutation step of particle filtering is then applied selectively on the first set of variables, which allows reduction in the number of particles to be maintained during the iterations as compared with the "bootstrap" basic alternative.

Moreover, the second set of variables is considered as a state with a dimension of less than K which is estimated by means of an extended Kalman filter.

Now, the calculations applied by the extended Kalman filter comprise inversions of matrices which are particularly costly in computation burden. This computation burden is further multiplied by the number of particles to be processed by the Rao-Blackwell filter.

PRESENTATION OF THE INVENTION

The invention aims at proposing an estimator of the state of a non-linear dynamic system and subject to non-Gaussian measurement noises, for which the computation burden is reduced relatively to a conventional particle Rao-Blackwell filtering.

With this purpose, according to a first aspect, a method is proposed for estimating a state representative of the movement of a mobile system, the method applying a particle filtering and comprising the following steps applied from a reference particle from among several particles calculated earlier, the reference particle providing an estimation of the state and comprising a first set of variables and a second set of variables:

random mutation, by the particle filtering, of the first set of variables in a first mutated set of variables, parameterization of an extended Kalman filter by means of the first mutated set of variables, application of the extended Kalman filter parameterized in order to produce a new particle from the second set of variables and of data measured by at least one sensor, the method being characterized in that the extended Kalman filter is of the invariant type, and in that the second set of variables comprises at least orientation, velocity and position variables of the mobile system, the invariant extended Kalman filter being configured under the assumption that:

the pair of the orientation and position variables has an invariance property by applying a rotation or a translation to said pair, and that the pair of the orientation and velocity variables has an invariance property by applying a rotation or a translation to said pair.

An interesting property of the invariant extended Kalman filter is that the particles may have all a same covariance.

Accordingly, the use of an invariant Kalman filter in the particular context of particle filtering causing motion of k particles gives the possibility of doing without the calculation of k covariances, and therefore considerably reducing the computation burden required for estimating the state, as compared with a conventional particle Rao-Blackwell filtering.

It may be noted that the invariant extended Kalman filter described in document "Invariant Extended Kalman Filter: theory and application to a velocity-aided attitude estimation problem" discussed in the introduction, does not involve the position of the relevant mobile system but only its orientation and its velocity; further, the invariance assumption described in this article cannot be generalized to a system further including a position variable.

The method according to present invention thus proposes the configuration of an invariant extended Kalman filter under two invariance assumptions, one fulfilled by a pair of orientation and velocity variables, and the other fulfilled by a pair of orientation and position variables.

The invention may also be completed with the following features, taken alone or in any of their technically possible combinations.

The second set of variables may comprise a covariance representative of an uncertainty in the Kalman sense of the other variables of the second set.

The steps of the method according to the first aspect may be repeated for each of the particles, the Kalman filter using a Ricatti equation common for all the particles.

The mutation step takes into account measurements of the state for producing the first mutated set of variables.

The steps of the method according to the first aspect being repeated for each of the particles, the mutation step may comprise a Cholesky decomposition common for all the particles.

The invariant extended Kalman filter may be applied for a plurality of particles, said application may comprise propagation of the second set of variables by integrating a dynamic equation, the integration comprising, for a reference particle:

the determination of a general solution having a form with at least one unknown, the choice of initial conditions for determining a complete solution specific to the reference particle, the determination of the general solution being applied only once for all the particles.

The estimation method according to the first aspect advantageously finds application in the field of satellite navigation.

The first set may then contain variables representative of a bias in satellite radionavigation measurements.

According to a second aspect, a unit for processing measured data is proposed, adapted for applying the method according to the first aspect.

Further according to a third aspect, a computer program product is further proposed, comprising program code instructions for executing the steps of the method according to the first aspect, when this program is executed by this data processing unit.

According to a fourth aspect, a method is also proposed for estimating the state of a mobile system applied by a navigation central unit comprising at least one satellite radionavigation signal receiver, at least one inertial sensor, the method comprising the following steps:

acquiring measurements by the sensors, applying the steps of the method according to the first aspect for producing a set of particles from the measured data, estimating the state of the mobile system from the set of particles.

According to a fourth aspect, a navigation central unit is further proposed, comprising:

at least one satellite radionavigation signal receiver, at least one inertial sensor, a unit for processing measurement data for estimating a navigation state of the central unit from measurements acquired by the receiver and by the inertial sensor.

DESCRIPTION OF THE FIGURES

Other features, objects and advantages of the invention will become apparent from the following description, which is purely illustrative and non-limiting, and which should be read with reference to the appended drawings wherein.

On the whole of the figures, similar elements bear identical references.

DETAILED DESCRIPTION OF THE INVENTION

The following description comprises three parts:

a first part (I) describing the general principle of invariant particle filtering according to an embodiment of the invention, a second part (II) describing a particular embodiment applied to the estimation of the state of a navigation central unit, a third part (III) giving details on the particular and optional implementation tricks of the embodiment according to the second part.

I. General Operating Principle of Invariant Particle Filtering

Figure 1:
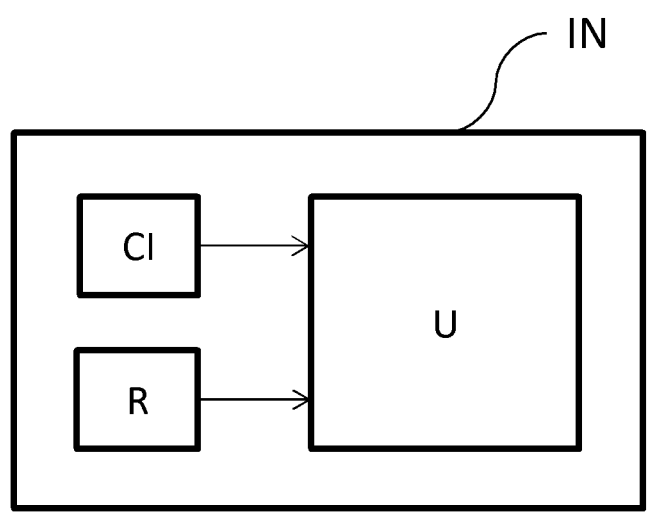
FIG. 1 schematically illustrates an inertial central unit according to an embodiment of the invention.

With reference to FIG. 1, in a first phase, a unit U for processing measurement data is considered.

The processing unit U is for example a processor or a set of processor(s) adapted for executing a computer program comprising program code instructions.

The unit U is configured for applying an estimator described in the following as an "invariant particle filtering", this estimator having the goal of estimating the movement of a mobile system.

Invariant particle filtering requires a Rao-Blackwell particle filter combined with a Kalman filter of a particular type: an invariant extended Kalman filter.

At this stage, it is also assumed that the processing unit U comprises an input receiving data measured by one or several suitable sensors for measuring physical quantities relating to the mobile system (velocity, position, acceleration, etc.).

These measurements are also designated as "observations" subsequently.

First of all a set of variables governed by a linear system which may be processed by a Kalman filter defined by matrix equations is considered. These matrix equations, known beforehand in the case of a conventional Kalman filter, here depend on one or several unknown additional parameters randomly changing overtime.

Particle filtering is therefore used for producing different samples (or particles) of these additional parameters. Each particle provides a specific set of linear equations used by the Kalman filter for elaborating a new estimation of the set of variables mentioned earlier.

The Kalman filter also provides a likelihood value of each tested parameter. The additional parameters are then selected according to their likelihood.

The Kalman filter used is of the invariant extended type.

The use of this invariant extended filtering gives the possibility of processing a set of variables governed by a system, this time non-linear, the set of variables having an invariance property. This invariance property is notably discussed in the article "Invariant Extended Kalman Filter: theory and application to a velocity-aided attitude estimation problem" by S. Bonnabel, P. Martin and E. Salaun, published in Decision and Control, 2009 held jointly with the 2009 28th Chinese Control Conference, CDC/CCC 2009. Proceedings of the 48th IEEE Conference on (pp. 1297-1304). IEEE. It will be noted here that the addition of a position variable prevents the obtaining of the invariance assumption discussed in these articles. But invariant filtering configured as if it was verified however has advantageous properties of which the invention makes use.

The processing unit U applies invariant particle filtering in successive iterations, or cycles, for estimating the successive states of the mobile system, the time-dependent change of said states being representative of the movement of the mobile system.

Subsequently it is considered that the term of "state" may refer to a set of representative variables of physical quantities related to the mobile system (velocity, position, acceleration, etc. of this mobile system).

Each iteration taking as an input data calculated by the unit U in a preceding iteration, as well as external measurements provided by sensors, each iteration producing new estimations of the state designated with the conventional term of particles as this was seen in the introduction.

The state is built from the set of variables attitude/position/velocity and from the aforementioned additional parameters. The state may be represented by a vector comprising a first set of variables (the additional parameters) and a second set of variables (attitude/position/velocity at the very least).

A current iteration of particle filtering applied by the data processing unit U will now be described according to an embodiment illustrated in FIG. 2.

It is assumed that k weighted particles were calculated during a preceding iteration of the invariant particle filtering. By definition, each particle is a vector comprising:
- a vector containing at least attitude, position and velocity,
- a vector containing the additional parameters,
- the covariance of the variables of the second set of variables.

Each particle is subject to several processing operations during the current iteration. From among the k particles, a given particle, a so-called reference particle is considered for which these processing operations are described.

a) Mutation

In a so-called "mutation" step (step 101), the additional parameters of the reference particle are randomly propagated in their space, as for conventional particle filtering. The obtained result is a set of modified additional parameters, designated as "mutated" subsequently.

According to a particular alternative, when an observation is available (observation step 200), the mutation step 101 may take this observation into account in addition to the random propagation model used. This correction thus gives the possibility of reconciling the particles with actual additional parameters.

It will be noted that this correction is advantageous in the case when the observation is subject to sudden jumps (a phenomenon encountered in the case when the observation stems from a GNSS/GPS receiver, as this will be seen in a particular application of the method according to the invention in part II).

For example this correction may use for implementing this correction the technique designated as "optimal sampling". Other heuristics may nevertheless be used.

b) Propagation/Updating

The equations of the invariant Kalman filter comprise a dynamic equation, representing the a priori behavior of the system, and an observation equation, representing the behavior of the sensors used for obtaining observations, also called measurements.

The equations of the Kalman filter are parameterized depending on the values of the set of mutated additional parameters obtained at the end of the mutation step 101.

In the particular case when the dynamic equation does not depend on the additional parameters, it is possible to omit the mutation step when there is no available observation.

The second set of variables of the reference particle is then estimated by means of the invariant extended Kalman filter.

Figure 3:
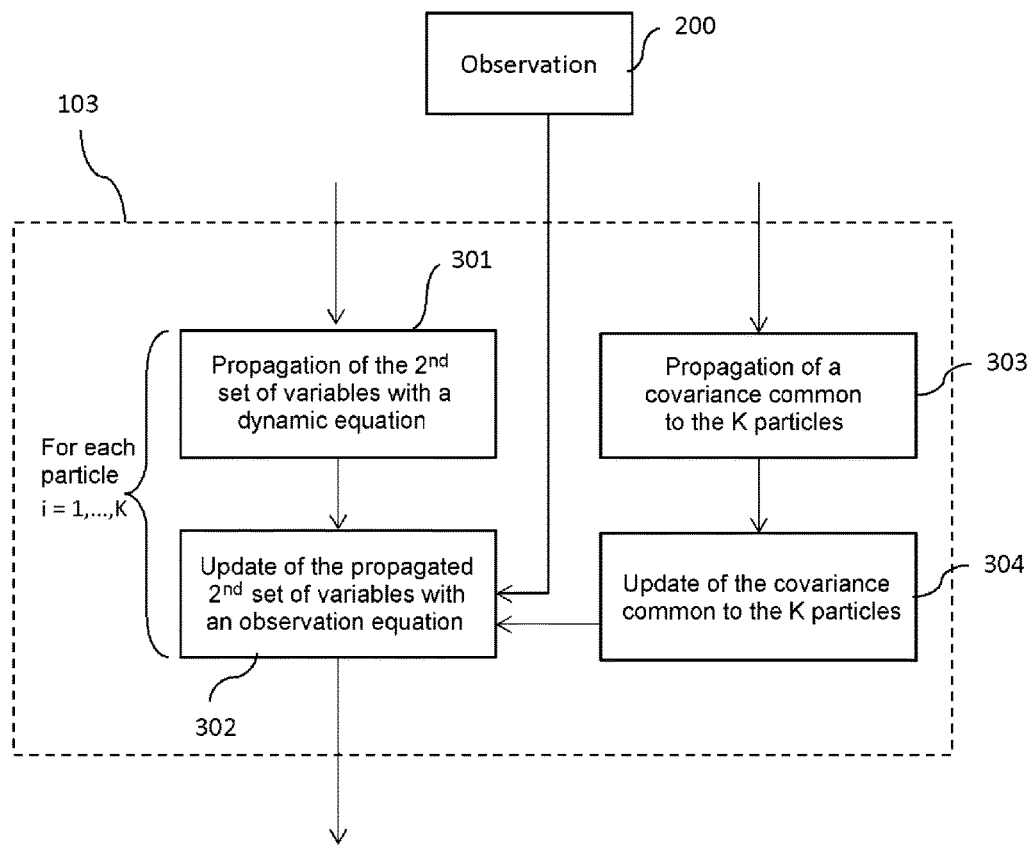
FIG. 3 details a particular step of FIG. 2 applied by an invariant Kalman filter.

With reference to FIG. 3, the vector of the second set of variables is propagated in the way of an invariant Kalman filter, by using the dynamic equation (a so-called propagation step 301).

The covariance of the variables making up the second set of variables (containing at least attitude, position and velocity) is also subject to a propagation by means of Riccati's equation associated with the invariant Kalman filter (step 303), built by using the dynamic equation.

If a new observation is made available by the sensors used (observation step 200), the vector of the second set of variables is updated like an invariant Kalman filter, by using the observation equation of this filtering parameterized with the additional parameters. Also, the covariance obtained at the end of the propagation steps 303 is updated by means of the invariant Kalman filter.

The update 302 by the invariant extended Kalman filter also provides a likelihood for the new particle.

Returning back to FIG. 2, in a weighting step 104, the weight of the particle is multiplied by the exponential of the likelihood.

At the output of the invariant Kalman filter a new weighted particle is obtained, elaborated from the reference particle.

It will be noted that the weighting step, which is ordinarily applied in particle filtering of the "bootstrap" type, is here applied from data produced by the invariant extended Kalman filter.

The steps above are repeated during the current iteration for the other k−1 particles, thus producing k−1 other new particles each provided with a corresponding weight.

The weight may be normalized so that their sum has the value 1.

The current iteration therefore produces k new weighted particles.

c) Selection

The current iteration may also comprise a selection step 105, during which particles provided with a low weight are removed while particles provided with a high weight, more likely, are duplicated. This selection may be triggered on a weight dispersion criterion, in order to minimize the problem of degeneration of the mentioned weight.

The selection 105 produces k new weighted particles which are then used as input data of a subsequent iteration of the invariant particle filtering.

An interesting property of the invariant Kalman filter is that the covariance is often common for the k particles. Accordingly, the use of an invariant Kalman filter gives the possibility of doing without the computation of k covariances, and therefore considerably reducing the computation burden required for applying the propagation and updating steps, which comprise inversions of matrices which are particularly expensive. The step 102 is therefore applied only once in the current iteration as regards the propagation of the common covariance.

Accordingly, the proposed method is therefore particularly advantageous since the processing unit U is limited in computation burden (this is typically the case for equipment onboard aircraft).

d) Estimation

At the end of an iteration, an estimation of the state (or of a function of the state) may be calculated by performing a weighted average of the k new particles. It is not necessary to proceed with such an estimation at the end of each iteration, but only at the end of some of them.

The estimation of the obtained state is the output datum of the estimator.

II. Application of Invariant Particle Filtering to a Central Navigation Unit

Returning back to FIG. 1, a navigation central unit IN comprises at least one satellite radionavigation signal receiver R, at least one inertial sensor CI, and a data processing unit U adapted for applying the invariant particle filtering as defined in part I.

In this application, the processing unit U is more particularly configured for applying an estimation of a navigation state of the central unit, from measurements acquired by the receiver and the inertial sensor, and by means of the invariant particle filtering described above.

The inertial sensors comprise in an embodiment, three gyrometers (one per axis) and three accelerometers (one per axis).

The receiver R is of the GNSS/GPS type.

Variables

The following variables are used:
the relevant instant t
orientation of the carrier $T_t$ (rotation matrix)
velocity of the carrier $v_t$ (3-dimensional vector)
position of the carrier $x_t$ (3-dimensional vector)
GPS bias $b_t$ (3-dimensional vector).

Inputs of the System

The inputs of the system are the following:
angular velocity $\omega_t$ (3-dimensional vector, given by the gyrometer)
specific force $f_t$ (3-dimensional vector, given by the accelerometers)

Observations

The observations (in the sense of a Kalman filter) are: a position measurement $Y_n$ provided at instants $t_n$ by the receiver R (3-dimensional vector).

Equations Applied

The equations followed by these variables are:

$$\frac{d}{dt}T_t = T_t(\omega_t + w_\omega)_\times$$

$$\frac{d}{dt}v_t = g + T_t(f_t + w_f)$$

$$\frac{d}{dt}x_t = v_t$$

$$Y_n = x_{t_n} + b_{t_n} + V_n$$

Wherein $w_\omega$ is the noise (of variance $Q_\omega$) associated with the measurement of the gyroscope, $w_f$ is the noise (of variance $Q_f$) associated with the measurement of the accelerometer, $V_n$ is the non-biased portion of the noise associated with the measurement of the GPS receiver and g is the gravity vector at the location given by the GPS. The variance of $V_n$ is noted as $r^2$.

$b_t$ is constant, except at random instants where it is subject to a jump and assumes a Gaussian random value, of average 0 and of variance $\sigma_b^2$. The duration between two jumps is independent of the other variables and follows an exponential law of parameter $\lambda$. The following notations will be further used:

$$H = \begin{pmatrix} 0_3 \\ 0_3 \\ I_3 \end{pmatrix}^T, \mathcal{N}(y, \Sigma, x) = \frac{1}{(2\pi)^{\frac{dim(\Sigma)}{2}}|\Sigma|^{1/2}}\exp\left(-\frac{1}{2}(y-x)^T\Sigma^{-1}(y-x)\right)$$

(Gaussian density of average x and of covariance $\Sigma$). For any vector $u \in \mathbb{R}^3$, the 3×3 anti-symmetrical matrix will be noted as $(u)_\times$ such that for any other vector $x \in \mathbb{R}^3$ one has $(u)_\times x = u \times x$, the symbol × referring to the vector product.

The set of variables processed by invariant filtering (second set of variables) is formed by $T_t, v_t, x_t$.

Indeed, if the bias is known, the problem may be reformulated by using the following variables:

$$\chi = \begin{pmatrix} T_t & v_t & x_t \\ 0_{1\times 3} & 1 & 0 \\ 0_{1\times 3} & 0 & 1 \end{pmatrix}, w = \begin{pmatrix} (w_\omega)_\times & w_f & 0_{3\times 1} \\ 0_{1\times 3} & 0 & 0 \\ 0_{1\times 3} & 0 & 0 \end{pmatrix}$$

The system is then rewritten as:

$$\frac{d}{dt}\chi_t = g_{\omega,f}(\chi_t) + \chi_t w$$

-continued $$Y_n = \chi_t \begin{pmatrix} V \\ 0 \\ 1 \end{pmatrix}$$

Wherein $g_{\omega,f}$:
$$\begin{pmatrix} T_t & v_t & x_t \\ 0_{1\times 3} & 1 & 0 \\ 0_{1\times 3} & 0 & 1 \end{pmatrix} \rightarrow \begin{pmatrix} T_t(\omega_t)_\times & T_t f_t + g_t & v_t \\ 0_{1\times 3} & 0 & 0 \\ 0_{1\times 3} & 0 & 0 \end{pmatrix}$$

is a function depending on the increments $\omega_t$ and $f_t$. It assumes as an argument a 5×5 matrix gives back a 5×5 matrix and verifies:

$$g_{\omega,f}(x_1 x_2) = x_1 g_{\omega,f}(x_2) + g_{\omega,f}(x_1) x_2 - x_1 I_5 x_2.$$

The additional parameters are: the bias $b_t$.

Particles comprising $(\hat{T}_t, \hat{v}_t, \hat{x}_t, \hat{b}_t)$ are therefore considered here.

Figure 2:
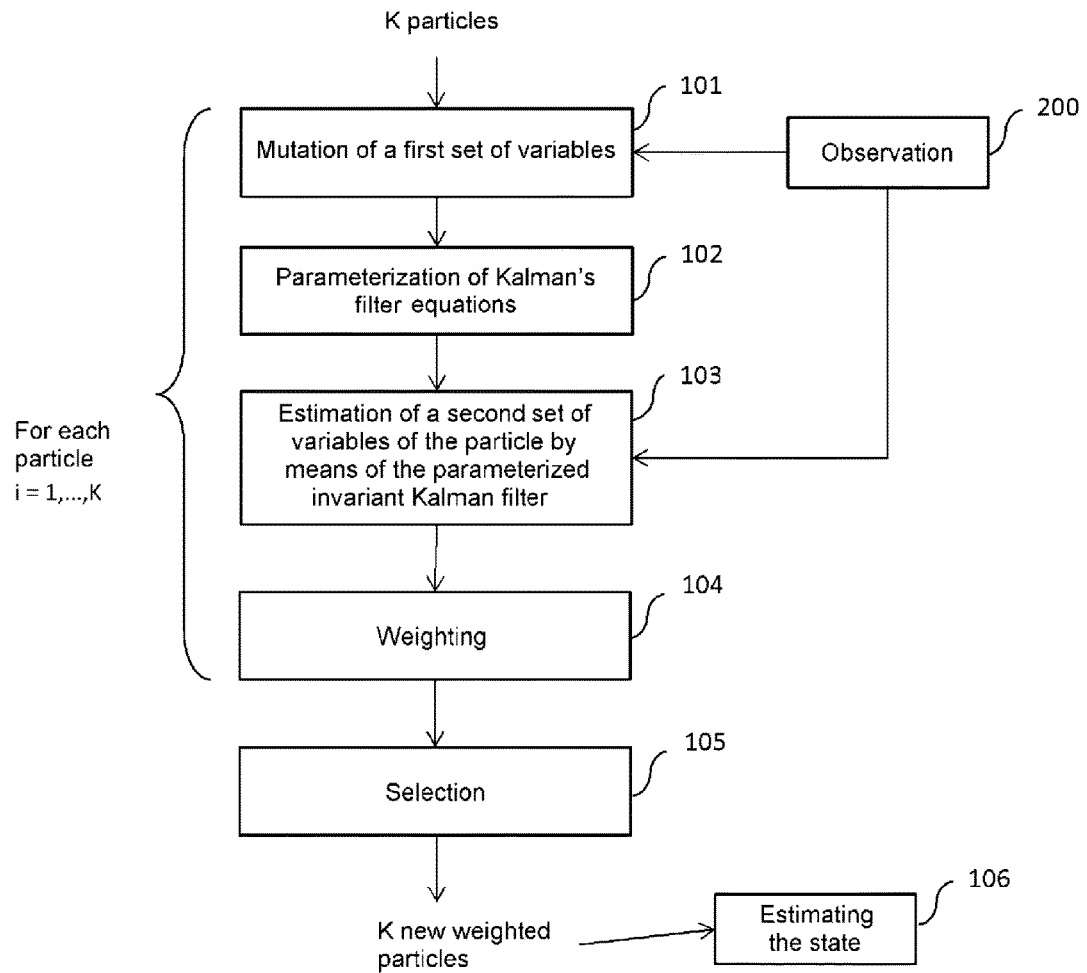
FIG. 2 represents the steps of a particle filtering method according to an embodiment of the invention.

Now the steps of FIG. 2 applied to the inertial central unit will be again detailed.

In a preliminary resetting step, the second set of variables (attitude/position/velocity) is reset according to an a priori density, the weights of the k particles are reset to 1/k, the values of the biases are randomly drawn according to an a priori density, the common covariance to all the particles is reset to an a priori estimated value.

a) Mutation

In the mutation step 101, the bias b is randomly propagated in its space, as for conventional particle filtering.

In the present system, the dynamic equation does not depend on the bias $b_t$: it is possible to omit the mutation step when there is no available observation.

If an observation is available at instant $t_n$, i.e. when the receiver R produces a new GPS measurement provided with a corresponding bias, the mutation step is applied by the following equations.

$\Pi_1$ and $\Pi_2$ are calculated according to the following definitions:

$$\Pi_1 = (1 - e^{-\lambda \Delta t}) \aleph (Y_n, \hat{T}_{t_n} H P H^T \hat{T}_{t_n}^T + \sigma_s^2 I_3 + r^2 I_3, \hat{x}_{t_n})$$

$$\Pi_2 = e^{-\lambda \Delta t} \aleph (Y_n, \hat{T}_{t_n} H P H^T \hat{T}_{t_n}^T + r^2 I_3, \hat{x}_{t_n} + \hat{b}_{t_n})$$

Wherein $\Delta t = t_{n+1} - t_n$ is the interval separating the arrival of the last two observations.

s is the embodiments of a real random variable according to a uniform law on [0,1].

If $$s < \frac{\Pi_2}{\Pi_1 + \Pi_2},$$

the bias $\hat{b}_{t_n}$ does not change. Otherwise it is updated as follows:

$$\hat{b}_{t_n} \leftarrow \hat{b}_{t_n} + N_1$$

Wherein $N_1$ follows a Gaussian law of average $\hat{T}_{t_n} K_b \hat{T}_{t_n}^T (Y_n - \hat{x}_{t_n})$ and of variance $\hat{T}_{t_n} P_b \hat{T}_{t_n}^T$, with $K_b = \sigma_b^2 (\hat{H} P H^T + \sigma_b^2 I_3 + r^2 I_3)^{-1}$ and $P_b = \sigma_b^2 (I_3 - K_b)$.

In other words, the bias is updated according to the equation:

$$\hat{b}_{t_n} \leftarrow \hat{b}_{t_n} + \hat{T}_{t_n} K_b \hat{T}_{t_n}^T (Y_n - \hat{x}_{t_n}) + L \times n_1$$

Wherein L verifies the relationship: $L \times L^T = \hat{T}_{t_n} P_b \hat{T}_{t_n}^T$ It will be noted that in the dynamic system according to the present particular application, the dynamic equation does not depend on the bias, and the observation equation actually depends on the bias b.

b) Propagation/Update

The vector of the second set of variables and its covariance are then propagated (propagation steps 301, 303) by means of an invariant Kalman filter, by using the following dynamic equation.

$$\frac{d}{dt} \hat{T}_t = \hat{T}_t (\omega_t)_\times$$

$$\frac{d}{dt} \hat{v}_t = g + \hat{T}_t f_t$$

$$\frac{d}{dt} \hat{x}_t = \hat{v}_t$$

$$\frac{d}{dt} P_t = F_t P_t + P_t F_t^T + Q$$

With $F_t = \begin{pmatrix} -(\omega_t)_\times & 0_{3\times 3} & 0_{3\times 3} \\ -(f_t)_\times & -(\omega_t)_\times & 0_{3\times 3} \\ 0_{3\times 3} & I_3 & -(\omega_t)_\times \end{pmatrix}$ and $Q = \begin{pmatrix} Q_\omega & 0_{3\times 3} \\ 0_{3\times 3} & Q_f \end{pmatrix}$ These equations amount to integrating a linear differential equation from inertial measurements. This equation is the same for all the k relevant particles at the input of the current iteration: its calculation may therefore be applied only once for all the particles to be processed during the current iteration.

If the GPS observation is available, the vector of the second set of variables and the associated covariance obtained at the end of the propagation step are then updated like an invariant Kalman filter, by means of the following equations.

$$\begin{pmatrix} \hat{T}_{t_n} & \hat{v}_{t_n} & \hat{x}_{t_n} \\ 0_{1\times 3} & 1 & 0 \\ 0_{1\times 3} & 0 & 1 \end{pmatrix} = \begin{pmatrix} \hat{T}_{t_n} & \hat{v}_{t_n} & \hat{x}_{t_n} \\ 0_{1\times 3} & 1 & 0 \\ 0_{1\times 3} & 0 & 1 \end{pmatrix} \exp(K_n \hat{T}_{t_n}^T (Y - \hat{b}_{t_n} - \hat{x}_{t_n}))$$

With $K_n = P_{t_n} H^T (r^2 I_3 + H P_{t_n} H^T)^{-1}$

The covariance P is also updated, with the following formula:

$$P \leftarrow (I_9 - K_n H) P$$

The updating step 304 of the covariance is also carried out once for all the k particles.

A new particle is obtained, elaborated from the reference particle, by applying the steps above.

The update 302 also provides a likelihood for the new particle, from which the weight of the new particle is calculated.

c) Selection

The selection step is applied according to the general principle (see part I).

d) Estimation

Certain variables of the state do not lend themselves to a linear average, as for example an orientation assuming values between −180° and 180°. Any average on a variety may therefore be used, for example one of those discussed in the «article On averaging rotations» by Gramkow, C. (2001), in *Journal of Mathematical Imaging and Vision*, 15(1-2), 7-16.

III. Tricks for Implementation of Invariant Particle Filtering in a Navigation Central Unit a) Mutation Optimization It was seen earlier that the mutation 101 may take into account a new observation.

In the application according to part II, the mutation comprises a Cholesky decomposition for each particle, a quite expensive decomposition in computation burden.

The Cholesky decomposition may be put in common for the k particles, as follows: it is desired to obtain a matrix L verifying $L*L^T=\hat{T}_{t_n}P_b\hat{T}_{t_n}^T$. Now, the matrix $P_b$ does not depend on the relevant particle. Once and for all the Cholesky decomposition $P_b=L_0*L_0^T$ may therefore be calculated once and then posed for each particle $L=\hat{T}_{t_n}L_0$.

Therefore at the output of the mutation step 101, more likely particles are therefore available since they take into account the last observation, for a more reduced burden.

b) Putting Propagation Calculations in Common

It was seen previously that the propagation step 302 of the second set of variables was applied for each of the k particles in the current iteration, and that this propagation step comprising the integration of a linear differential equation.

In a way known per se, such an affine equation is integrated in two phases: a general form of a solution with one unknown is first determined and this unknown is determined by means of initial conditions, specific to each particle. The general form of the solution, completed with the value of the unknown, becomes a particular solution for each particle.

In an advantageous implementation of the invariant particle filtering, it is possible to only calculate a single general form of the solution, for all the particles, given that this general form is common to the latter.

The only processing operation specific to each particle is reduced upon determining the initial conditions.

This principle may be illustrated by the following calculations in the present particular application:

Between two observations, for which the arrival times will be noted as $t_n$ and $t_{n+1}$ and the deviation $\Delta t=t_{n+1}-t_n$, the following quantities are calculated only once for all the particles:

$$R_{t_n} = \begin{pmatrix} 1 & 0 & 0 \\ 0 & 1 & 0 \\ 0 & 0 & 1 \end{pmatrix}, \frac{d}{ds}R_s = R_s(\omega_s)_x, \overline{R_n} = R_{t_{n+1}}$$

$$\overline{\Delta v_n} = \int_{t_n}^{t_{n+1}} R_s f_s ds$$

$$\overline{\Delta x_n} = \int_{t_n}^{t_{n+1}} \left(\int_{t_n}^{t} R_s f_s ds\right) dt$$

At the moment when the observation arrives, the following quantities are updated for each particle:

$$\hat{x}_{t_n} \leftarrow \hat{x}_{t_n} + \tfrac{1}{2}\Delta t^2 g + \Delta t\, \hat{v}_{t_n} + \hat{T}_{t_n}\overline{\Delta x_n}$$

$$\hat{v}_{t_n} \leftarrow \hat{v}_{t_n} + \hat{T}_{t_n}\overline{\Delta v_n} + \Delta t * g$$

$$\hat{T}_{t_n} \leftarrow \hat{T}_{t_n}\overline{R_n}$$

The general method described in part I is not limited to the specific application described in part II. Invariant particle filtering has the role of being used for estimating any state, notably those for which the measurements are subject to similar jumps to those encountered with GPS receivers.

For example, invariant particle filtering may be used for estimating the position of a robot using a depth camera.

The invention claimed is:

1. A method for estimating a state representative of the movement of a mobile system, the method applying a particle filtering and comprising the following steps applied from a reference particle from among several particles calculated earlier, the reference particle providing an estimation of the state and comprising a first set of variables and a second set of variables, the first set of variables containing at least a bias in satellite radio navigation measurements:
   random mutation (101), by the particle filtering, of the first set of variables in a first mutated set of variables,
   parameterization (102) of an extended Kalman filter by means of the first mutated set of variables,
   application (103) of the extended Kalman filter parameterized in order to produce a new particle from the second set of variables and of data measured by at least one sensor,
the method being characterized in that the extended Kalman filter is of the invariant type, and in that the second set of variables comprises orientation, velocity and position variables of the mobile system, the invariant extended Kalman filter being configured under the assumption that:
   the pair of the orientation and position variables has an invariance property by applying a rotation or a translation to said pair, and that
   the pair of the orientation and velocity variables has an invariance property by applying a rotation or a translation to said pair.

2. The method according to claim 1, wherein the second set of variables comprises a covariance representative of an uncertainty in the Kalman sense of other variables of the second set.

3. The method according to claim 1, for which the steps are repeated for each of the particles, and wherein the Kalman filter uses a Ricatti equation common for all the particles.

4. The method according to claim 1, wherein the random mutation step takes into account measurements of the state for producing the first mutated set of variables.

5. The method according to claim 4, for which the steps are repeated for each of the particles, the random mutation step comprising a Cholesky decomposition common for all the particles.

6. The method according to claim 1, wherein the invariant extended Kalman filter is applied for a plurality of particles, said application comprises propagation of the second set of variables by integrating a dynamic equation, the integration comprising, for a reference particle:
   the determination of a general solution having a form with at least one unknown,
   the choice of initial conditions for determining a complete solution specific to the reference particle,
   the determination of the general solution being applied only once for all the particles.

7. A method for estimating the state of a mobile system applied by a navigation central unit comprising at least one satellite radionavigation signal receiver (R), at least one inertial sensor (CI), the method comprising the following steps:
   acquiring measurements (200) by the sensors (R, CI),
   applying the steps of the method according to one of claims 1 to 6 for producing a set of particles from the measured data,
   estimating (106) the state of the mobile system from the set of particles.

8. A unit for processing measured data adapted for applying the method according to one of claim 1.

9. A navigation central unit (S) comprising:
   at least one satellite radionavigation signal receiver (R),
   at least one inertial sensor (CI), the unit (U) for processing measurement data according to claim 8 for estimating a navigation state of the central unit from measurements acquired by the receiver and by the inertial sensor.

10. A computer program product comprising program code instructions for executing the steps of the method according to one of claims 1 to 7, when this program is executed by the unit for processing measured data.

\* \* \* \* \*